(12) United States Patent
Wright et al.

(10) Patent No.: US 7,833,307 B2
(45) Date of Patent: Nov. 16, 2010

(54) AIR DRYER WITH PRE-FILTER

(75) Inventors: Eric Wright, Evans Mill, NY (US);
Richard Kohar, Kingston (CA)

(73) Assignee: New York Air Brake Corporation, Watertown, NY (US)

( * ) Notice: Subject to any disclaimer, the term of this patent is extended or adjusted under 35 U.S.C. 154(b) by 880 days.

(21) Appl. No.: 11/736,253

(22) Filed: Apr. 17, 2007

(65) Prior Publication Data
US 2008/0087168 A1 Apr. 17, 2008

Related U.S. Application Data

(60) Provisional application No. 60/829,042, filed on Oct. 11, 2006.

(51) Int. Cl.
*B01D 59/50* (2006.01)

(52) U.S. Cl. .................. 55/482; 55/385.1; 55/DIG. 17; 96/134; 96/135; 210/338; 303/85

(58) Field of Classification Search .................... 96/135, 96/134; 210/338; 55/DIG. 17, 482, 385.1; 303/85
See application file for complete search history.

(56) References Cited

U.S. PATENT DOCUMENTS

| | | | | |
|---|---|---|---|---|
| 1,652,309 | A * | 12/1927 | Kingdon | 55/322 |
| 2,010,456 | A * | 8/1935 | Jones | 55/333 |
| 2,739,713 | A * | 3/1956 | Robinson | 210/338 |
| 2,841,420 | A * | 7/1958 | Woolsey et al. | 285/421 |
| 3,487,932 | A | 1/1970 | Forrester et al. | |
| 4,909,937 | A * | 3/1990 | Hoffmann et al. | 210/315 |
| 4,929,259 | A | 5/1990 | Caskey | |
| 5,286,283 | A * | 2/1994 | Goodell | 96/113 |
| 5,375,620 | A | 12/1994 | Ginder, Jr. | |
| 5,525,143 | A | 6/1996 | Morgan et al. | |
| RE35,433 | E * | 1/1997 | Alexander, III | 95/24 |
| 6,013,118 | A * | 1/2000 | Matsunuma et al. | 55/282.3 |
| 6,128,825 | A | 10/2000 | Cunkelman | |
| 6,136,073 | A | 10/2000 | Coan | |
| 6,174,351 | B1 | 1/2001 | McDowell et al. | |
| 6,719,825 | B2 | 4/2004 | Wedge et al. | |
| 6,776,820 | B2 | 8/2004 | Bikson et al. | |
| 7,334,847 | B2 * | 2/2008 | Goodell | 303/85 |
| 2003/0066427 | A1 * | 4/2003 | Ishida | 96/135 |
| 2004/0094036 | A1 * | 5/2004 | Nichols et al. | 95/148 |
| 2008/0087167 | A1 | 4/2008 | Wright et al. | |

FOREIGN PATENT DOCUMENTS

| | | |
|---|---|---|
| EP | 1 275 432 | 1/2003 |
| WO | WO 2006/034840 | 4/2006 |
| WO | WO 2007/041559 | 4/2007 |
| WO | WO 2007/090085 A | 8/2007 |

* cited by examiner

*Primary Examiner*—Jason M Greene
*Assistant Examiner*—Anthony Shumate

(57) ABSTRACT

A filter includes a housing having an air inlet, an air outlet, a first chamber and a second chamber concentric to and interior the first chamber. A coalescer is in the first chamber and a first filter is in the second chamber. A first inlet of the first chamber is interior the coalescer and connected to the air inlet and a first outlet of the first chamber being exterior the coalescer. A second inlet of the second chamber is interior the first filter and connected to the first outlet of the first chamber and a second outlet of the second chamber is exterior the first filter and connected to the air outlet. The filter includes a membrane separator in the housing connecting the second outlet of the second chamber and the air outlet. The filter may be mounted in a reservoir with the membrane separator extending into the reservoir.

27 Claims, 7 Drawing Sheets

AIR DRYER WITH PRE-FILTER

CROSS REFERENCE

This application claims the benefit of under 35 U.S.C. 119(e) and incorporates by reference provisional application 60/829,042 filed Oct. 11, 2006.

BACKGROUND AND SUMMARY OF THE DISCLOSURE

The present invention relates generally to air dryers, and more specifically, to an air dryer with an integral pre-filter for a brake system for vehicles.

Air dryers employing membranes consisting of a permeable membrane capable of blocking the passage of nitrogen and oxygen molecules, but allowing water vapor molecules to pass through, as described in U.S. Pat. Nos. 6,719,825 and 5,525,143 amongst many others. In one variation of the technology, the air to be dried passes through the center of the membrane element. The membrane permits the passage of the water vapor to the outside of the membrane, but prevents the passage of the air to the outside of the membrane, thereby drying the air.

To work effectively, the outside of the membrane must be kept dry and at a lower pressure than the inside, creating the partial pressure differential to drive the water vapor out. This is done by providing some fraction of the dry output air as a counter flow sweep air across the outside of the membrane. The sweep air can be provided by sweep air orifice(s) connecting the dry air in the membrane air dryer outlet to the sweep air chamber surrounding the outside of the membrane. The orifices control the volume of sweep air, typically 10-20% of the dryer capacity and create a pressure drop in the sweep air volume. The sweep air and entrapped moisture are expelled to atmosphere.

U.S. Pat. No. 6,719,825 shows a control valve at the inlet for the sweep air. U.S. Pat. No. 5,375,620 shows a self-adjusting flow metering device for the sweep air. An air dryer including a coalescing and charcoal pre-filters and a membrane filter is also shown by U.S. Pat. No. 6,719,825.

The present disclosure is directed to an air dryer, for example, for locomotives, packaged to fit inside a reservoir with a pre-filter exterior the reservoir. The air dryer is generally cylindrical with a circular mounting flange on one end, which bolts to a similar mounting flange welded to the end of the reservoir. This arrangement solves the problem of finding room for the air dryer between main reservoir #1 and #2 on a locomotive, protects the air dryer and especially the vulnerable membrane element from the very high ambient temperatures (as high as 300° F.) during operation of the locomotive in tunnels; protects the air dryer from environmental hazards, like flying stone ballast; eliminates installation piping, and minimizes weight.

A pre-filter includes a housing having an air inlet, an air outlet, a first chamber and a second chamber concentric to and interior the first chamber. A coalescer is in the first chamber and a first filter is in the second chamber. A first inlet of the first chamber is interior the coalescer and connected to the air inlet and a first outlet of the first chamber being exterior the coalescer. A second inlet of the second chamber is interior the first filter and connected to the first outlet of the first chamber and a second outlet of the second chamber is exterior the first filter and connected to the air outlet.

The first filter may be a charcoal filter. A second filter is in the first chamber concentric to the coalescer between the first inlet and the first outlet.

The first inlet may be a plurality of first inlets; and the housing includes a third chamber connecting the air inlet to the first inlets. The third chamber is an annulus and the air input is on an outer circumference of the annulus. The first outlet may be a plurality of first outlets and the second inlet may be a plurality of second inlets; and the housing includes a fourth chamber connecting the first outlets to the second inlets. The second outlet may be a plurality of second outlets; and the housing includes a fifth chamber connecting the second outlets to the air output.

The filter includes a membrane separator in the housing connecting the second outlet of the second chamber and the air outlet. A first drain on the housing is connected to the first chamber and a second drain on the housing is connected to a sweep air outlet of the membrane separator. A valve is connected between the sweep air outlet of the membrane separator and the second drain for controlling the draining of the liquid and sweep air flow through the membrane separator. Alternatively, the valve is connected to a sweep air inlet of the membrane separator for controlling sweep air flow through the membrane separator. A drain may also be provided for the annular third chamber.

The housing includes a first and second portions removably secured to each other. The first and second chambers are in the second portion of the housing and the first filter is mounted to and removable with the first portion of the housing as a unit. The housing includes a third portion removably secured to the second portion of the housing; and a membrane separator is in the third portion of the housing connecting the second outlet of the second chamber and the air output.

Another filter includes a housing having first and second portions separated by a center portion and the housing portions are removably secured to each other. An air inlet of the filter is on the center portion and an air outlet of the filter is on an end face of the second portion. A first chamber and a second chamber concentric to and interior the first chamber are provided and a coalescer is in the first chamber. A first inlet of the first chamber is interior the coalescer and connected to the air inlet via a first passage in the center portion and a first outlet of the first chamber is exterior the coalescer and connected to the second chamber. A third chamber is in the second housing portion and a membrane separator is in the third chamber and has an outlet connected to the air outlet and having an inlet. A second passage in the center portion connects the second chamber to the inlet of the membrane filter.

The filter includes an annulus shaped fourth chamber in the center portion connecting the air inlet to the first inlet and the air input is on an outer circumference of the annulus. A drain is connected to the first chamber and a drain is connected to the fourth chamber. Another drain is connected to a sweep air outlet of the membrane separator.

The filter may be mounted in a reservoir having an inlet. The filter extends from a reservoir inlet into the interior of the reservoir so that the housing's air inlet is the inlet of the reservoir, the housing's air outlet is interior the reservoir.

These and other aspects of the present method will become apparent from the following detailed description of the method, when considered in conjunction with accompanying drawings.

DETAILED DESCRIPTION OF THE PREFERRED EMBODIMENTS

Figure 1:
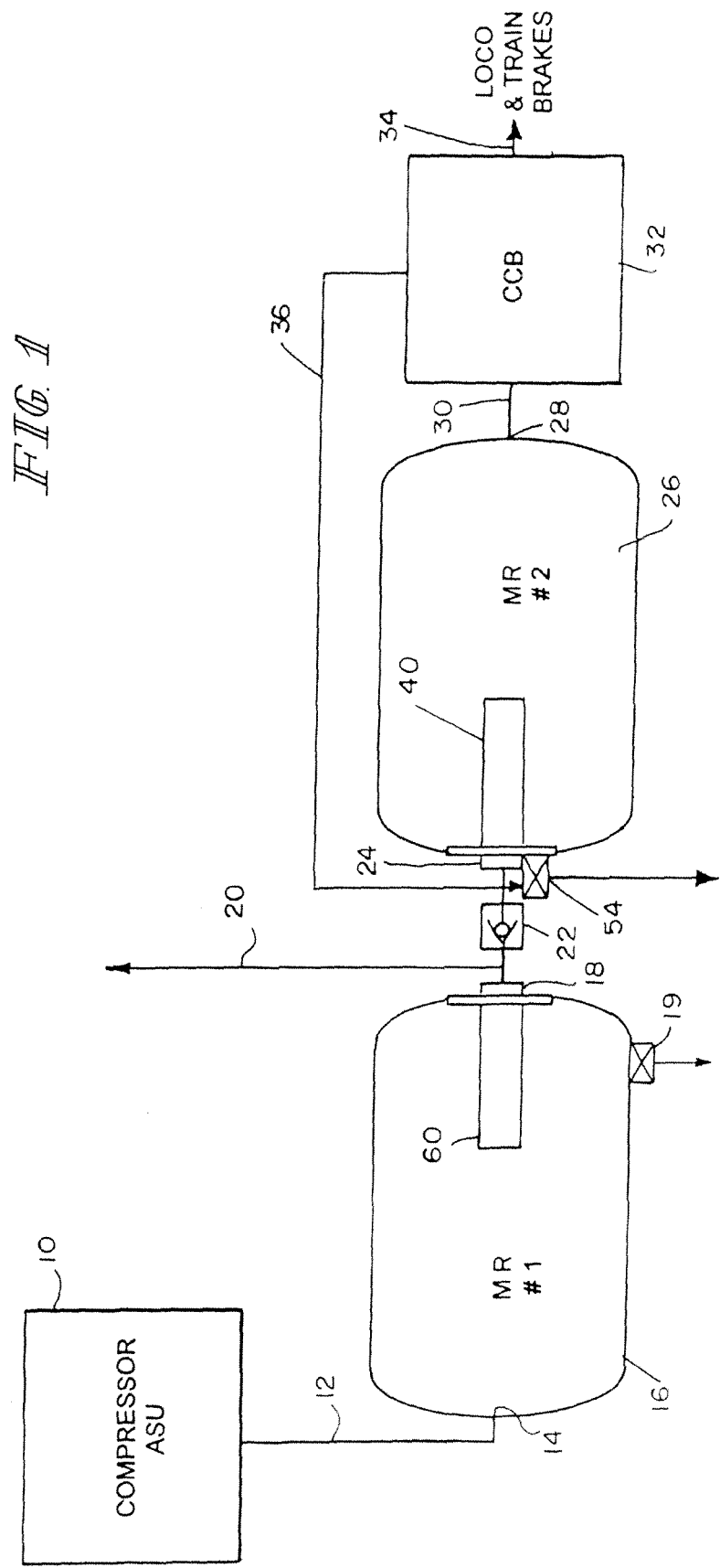
FIG. 1 is a schematic of a locomotive air supply and brake controller according to the present disclosure.

A locomotive brake supply and brake controller is shown in FIG. 1. A compressor 10 driven by the engines of the locomotive provides a source of compressed air through line 12 to inlet 14 of the first main reservoir MR 16. The outlet 18 of the reservoir 16 is connected to other non-brake air consuming devices at line 20. The outlet 18 is also connected to the inlet 24 of the second main reservoir 26 via one-way check valve 22. The outlet 28 of the second main reservoir MR 26 is connected to a brake controller illustrated as a CCB computer controlled brake system 32. The outlet 34 of the computer controlled brake system 32 provides an appropriate pneumatic control signals for the locomotive and train brakes.

As will be discussed below, the computer controlled brake system 32 provides, via line 36, control of the drain 54 of membrane air filter 40 within the main reservoir 26. This not only controls the drain, but the air flow in the sweep air passages. Alternatively, the control may be provided on the input of the air sweep passage as also described below. Control of the drain valve 19 of the first main reservoir MR 16 may be either from the computer brake control system 32 or other control systems on the locomotive.

The main reservoir 16 includes a coalescing pre-filter 60 therein. Coalescing pre-filter 60, although shown schematically in the outlet 18 of MR 16, can alternately be provided in the inlet 14 of MR 16.

Figure 2:
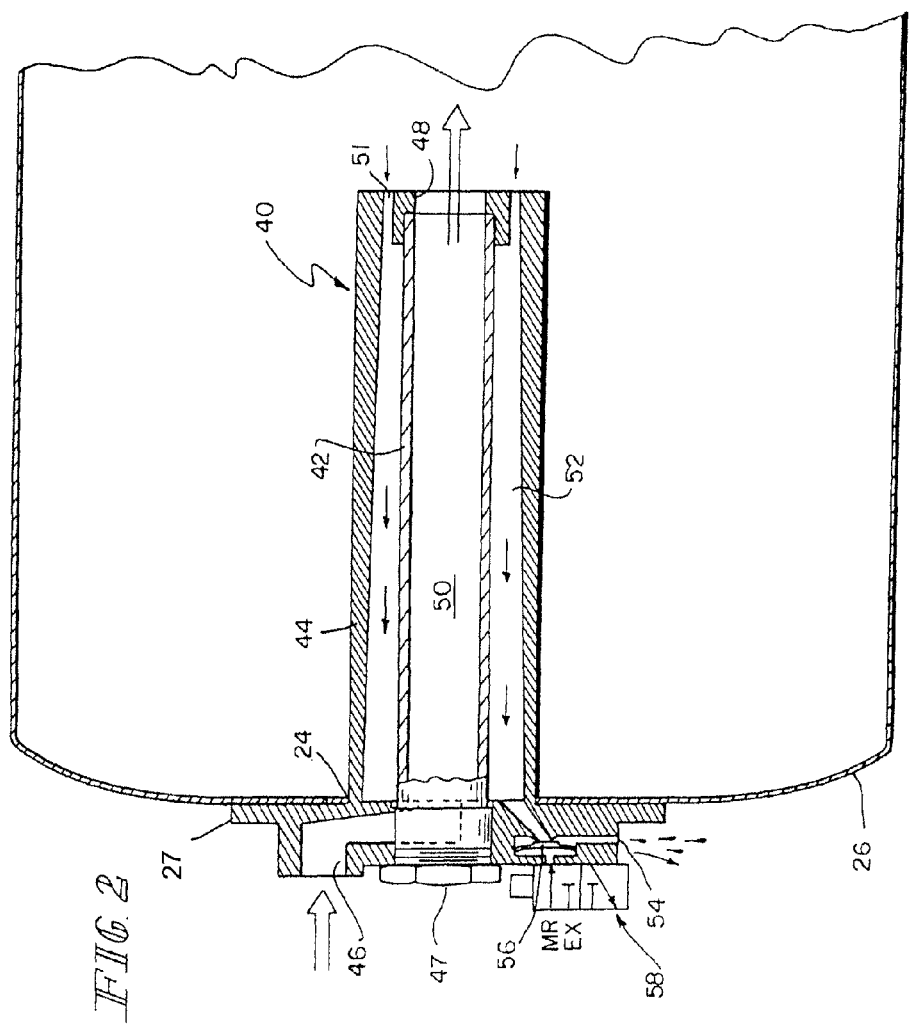
FIG. 2 is an embodiment of a membrane air dryer according to the present disclosure.

A membrane air dryer 40 is shown in FIG. 2 as including a housing 44 with an air inlet 46, an air outlet 48 and a liquid drain outlet 54. A membrane separator 42 is shown schematically with an inner surface and an outer surface extending between a first and second ends of the membrane 42. Typical construction of a membrane module is a bundle of small diameter hollow fibers (membrane), each with an inner surface and an outer surface extending between a first and second ends of the membrane. A first passage 50, made up of the inner diameters of each of the hollow fiber membranes in the housing 44 is connected to the air inlet 46 and air outlet 48 at its respective ends and extends between the first and second ends of the membrane 42 along one of the interior and the exterior of the membrane. A second passage 52 including the outer diameters of each of the hollow fiber membranes in the housing 44 is connected to the sweep air/drain outlet 54 and a sweep air inlet adjacent the housing's air outlet 48 at its respective ends. The second passage 52 extends between the first and second ends of the membrane 42 along the other of the interior and the exterior of the membrane. A valve 56,58 is connected between the second passage 52 and the drain outlet 54 for controlling the draining of the liquid and sweep air flow through the second passage 52.

The valve may be an electro-pneumatic valve or a solenoid controlled diaphragm-type (or conventional-type) drain valve 56,58. A cover plate 47 is removable mounted to the housing 44 adjacent the membrane 42 to allow removal of the membrane 42 from the housing 44. The air inlet 46 and the drain outlet 54 are offset from the axis of the membrane 42 and the cover plate 47. This allows servicing the membrane element 42 by removal of a cover or cover plate 47, without disturbing piping or removal of the complete unit from the reservoir 26.

The housing 44 may be mounted in the inlet 24 of a reservoir by a collar or flange 27 which may be welded to the main reservoir 26 or bolted to a flange on the inlet 24. The housing extends from the reservoir inlet 24 into the interior of the main reservoir 26 so that the housing inlet 46 is the inlet 24 of the main reservoir 26. The housing outlet 48 is interior the reservoir 26 and the drain outlet 54 of the housing 44 is exterior the main reservoir 26.

Most membrane dryers for industrial use have a constant sweep flow. This is undesirable on a locomotive as it wastes air and may deplete the air in the reservoir if the locomotive is idled with power shut off. Further, unlike many industrial uses, the air is consumed from the reservoirs 16 and 26 only intermittently by the pneumatic brake system. Main Reservoir 26, is generally protected by the check valve 22 and is used exclusively by the brakes. The membrane air dyer 40 for a locomotive solves this problem of wasted air due to a constant sweep flow by adding a solenoid controlled diaphragm-type (or conventional-type) drain valve 56,58 to the output of the sweep air chamber 52 shown in FIG. 2. Although the sweep air or drain valve 56,58 is shown schematically at the exhaust of the sweep air chamber, it could also be arranged to control the flow of sweep air into the inlet of the sweep air chamber while still venting the sweep air to the outside of the MR 26 as shown in FIG. 2.

When closed, the valve 56 closes the communication of the sweep volume through passage 52 to atmosphere, thereby preventing the venting of the sweep air. The drain valve 56 is controlled by a solenoid valve 58 which is controlled by the CCB computer controlled brake system 32 on the locomotive. The CCB 32, because it is a computer controlled brake system with transducers and other controls necessary for brake operation, can determine when the brakes are consuming air from the MR 26. In operation, the CCB 32 will open the dryer drain valve 56 whenever the brake system is consuming air from MR 26, which allows the resumption of flow of sweep air around the outside of the membrane element 42 in passage 52 at the same time that moisture laden air is flowing into the inlet 46 of the air dryer 40 to replenish the air used by the brakes. Thus, the air dryer 40 only consumes sweep air when sweep air is needed to dry air flowing through the air dryer.

Further, the CCB 32 can maintain sweep flow for a period of time after the brake system is no longer consuming air from MR 26 before closing the drain valve 56 to assure that the MR 26 is fully replenished with dry air, further it can maintain sweep flow for an additional predetermined time to assure that the sweep air volume is free of moisture. The lag time, during which the sweep flow is maintained after air consumption by the brakes, can be calculated based on the air flow measured by the CCB 32 and the duration of the flow, knowledge of compressor 10 on-off pressure switch points, and knowledge of the compressor output capacity. The lag time can alternatively or concurrently be determined by monitoring the pressure increase in MR 26 as it is replenished by the air supply system. When the rate of pressure increases in MR 26 decreases to some pre-determined level and/or the pressure in MR 26 reaches the compressor control upper limit pressure, the sweep air is terminated. Optionally the lag time calculation could be optimized by CCB 32 reading a digital signal from the compressor control indicating whether the compressor is pumping or not.

Sweep flow would be enabled whenever 1) the brake system consumes air, 2) the compressor 10 is turned on and the pressure in MR 26 is less than the compressor pressure upper limit control, typically 145 psi, and 3) for some lag time after cessation of air consumption by the brakes, until the MR 26 is substantively recharged and the sweep air volume is substantively purged of moist air.

Figure 3:
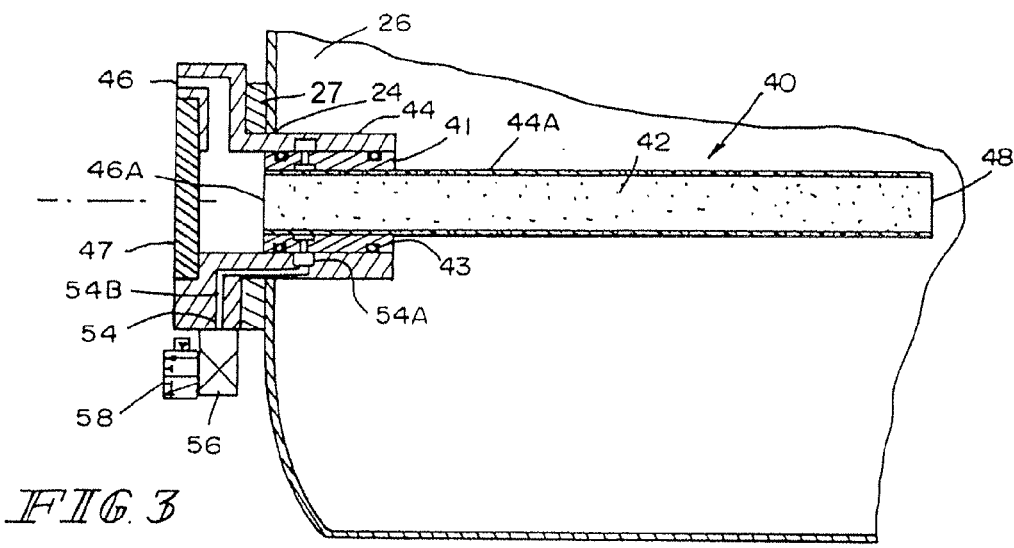
FIG. 3 is an embodiment of a membrane air dryer with a removable membrane air dryer module according to the present disclosure.

FIG. 2 shows the housing 44 as defining the appropriate passage for the filter element 42 to be removed from the housing 44. A variation is illustrated in FIG. 3 and shows the membrane filter element 42 and its housing 44A removable as a module from the housing 44. The housing 44 is joined to the flange 27 of the MR 26 and includes air inlet 46. The membrane housing 44A includes the membrane member 42 and has an air inlet 46A and the outlet 48. A collar 41 of the housing 44A is received in the housing 44. It is sealed thereto by sealing means 43, shown as o-rings. The pair of o-rings 43 on each side of the drain passage 54A which is aligned with passage 54B with housing 44 and connects it to the drain the drain outlet 54. Valve 56,58 are provided at the drain outlet 54. For maintenance, the cover plate 47 is removed and the membrane filter 40 including housing 44A, collar 41 and membrane 42 are removed. A new membrane air dryer or filter 40 may then be installed. The passages 50 and 52 are present, but are not shown.

The air dryer system for a locomotive may optionally include a coalescing pre-filter 60 to remove liquid water and oil vapor from the air stream prior to passing through the membrane 42, as well as the back-flow check valve 22 typically installed between MR 16 and 26. The coalescing pre-filter 60 can likewise be packaged in a cylindrical form with a circular mounting flange for mounting in the inlet 14 or discharge 18 end of MR 16, which feeds MR 26.

Alternatively, the coalescing pre-filter 60 may be installed in the inlet 14 of MR 16, instead of (or in addition to) the outlet 18 of MR 16. The backflow check valve 22 may be deleted or could be included as part of the membrane air dryer assembly. Coalescing filters generally work optimally when the air flow is directed from inside to outside the filter element and the coalesced liquid is allowed to drain from the outside of the element. Positioning the coalescing pre-filter in the inlet 14 to the MR 16 has the advantage of inside to outside air flow while eliminating a need for circuitous air routing in the filter housing, and eliminating the need for a pressure tight filter housing. In this arrangement, the coalesced liquid can drip to the bottom of the MR 16 where it is discharged by pre-existing automatic drain valves 19.

As a further alternative, the coalescing pre-filter 60 may be installed exterior and between both reservoirs 16 and 26. A drain valve would be provided and controlled by the computer control brake system 32 or other locomotive computer. The coalescing pre-filter 60 may be an integral unit with the membrane filter 40 or mounted to the inlet of the membrane filter 40 exterior the reservoir 26.

Figure 4:
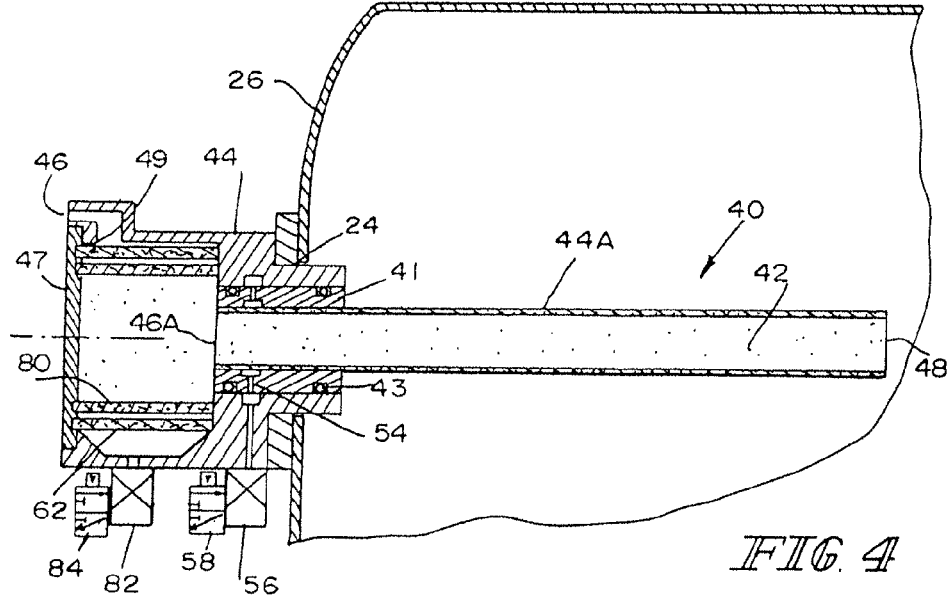
FIG. 4 is an embodiment of an air dryer with a removable membrane air dryer module with integral coalescing filter and particulate filter and two liquid drains according to the present disclosure.

Coalescing pre-filter 60 may also be provided in the MR 26 in combination with the membrane air dryer 40 as illustrated in FIGS. 4-7. The housing 44 is enlarged to include a chamber 49 for receiving a coalescing element 62 by itself or in combination with a particulate filter 80. They are mounted between the housing 44 and the cover plate 47. Appropriate recesses or ledges are provided on the housing 44 and the cover plate 47 to align and secure the filters 62 and 80 in the housing 44. As shown in FIG. 4, housing 44 is modified to provide a sump 45 to which a drain valves 82,84 are connected. These valves are identical to the valves 56,58 and may also be controlled by the CCB 32 such that they are opened at the appropriate time in the operation of the locomotive and/or flow of the air from the air supply.

Figure 5:
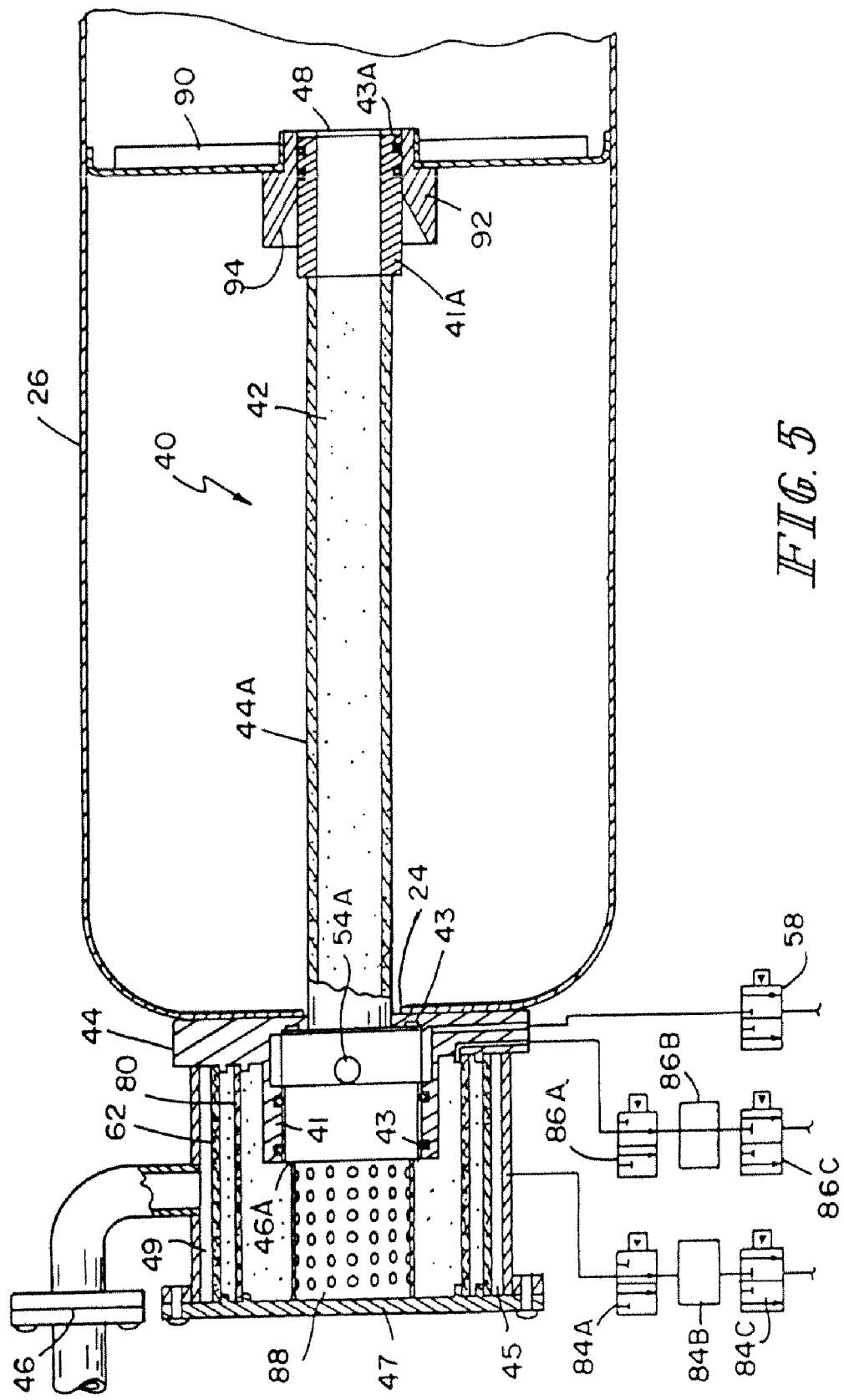
FIG. 5 is an embodiment of an air dryer with a removable membrane air dryer module with integral coalescing filter and particulate filter and three liquid drains according to the present disclosure.
Figure 7:
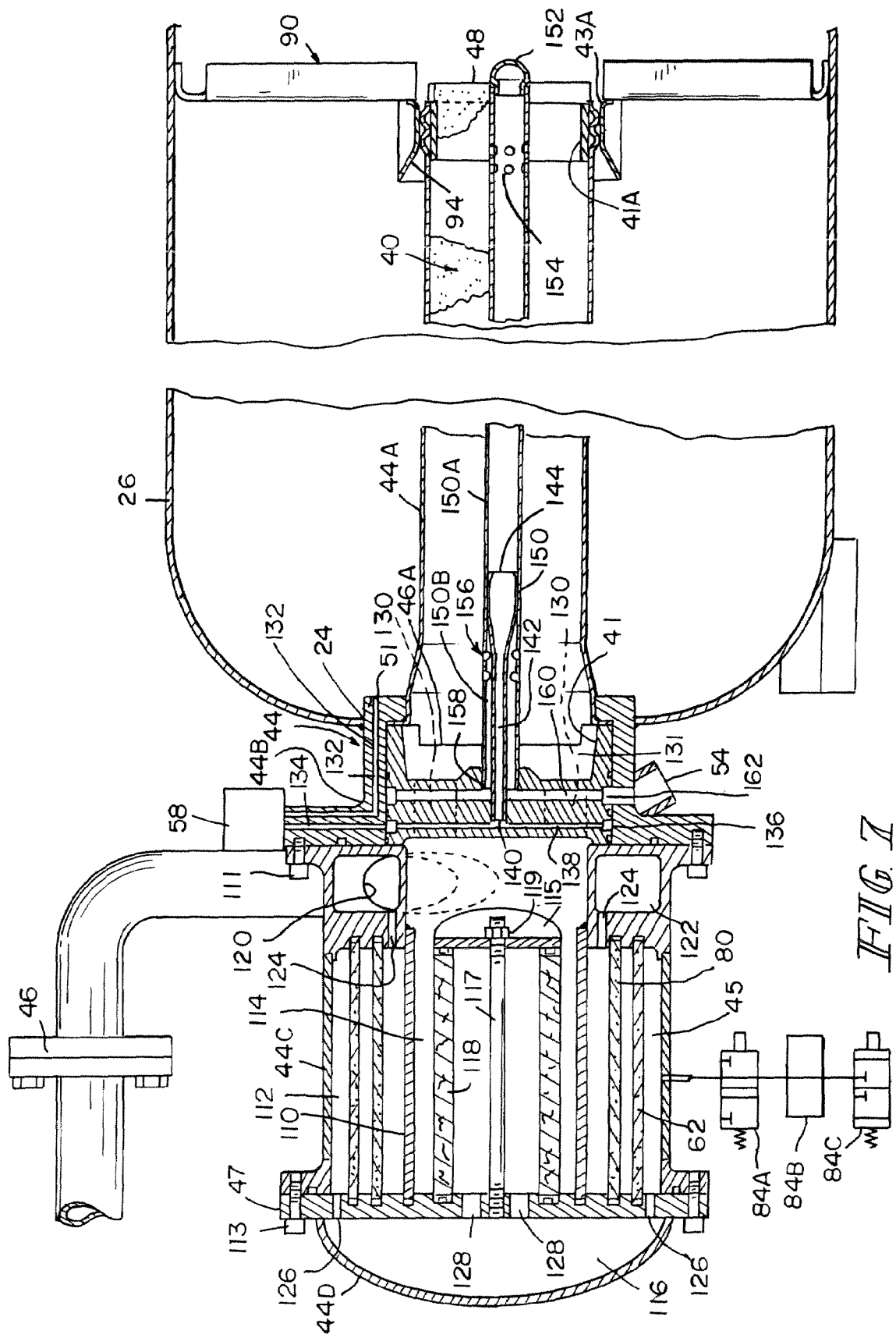
FIG. 7 is an embodiment of a membrane air dryer with integral particulate, coalescing and charcoal pre-filters arranged for inside-out flow of air through the coalescer.

In FIGS. 4, 5 and 7, the filter 62 and 80 are concentric with each other and coaxial to the membrane air dryer 40. The air through inlet 46 passes through the filter 62 and 80 prior to being received in the air inlet 46A of the membrane dryer 40. As well-known, the coalescing filter element 62 precipitates air-born water and oil vapor from the air stream. The particulate filter 80 filters out very fine air-born dust and solid material such as carbon particles from diesel combustion or other contaminants or other particulates which contaminate the membrane dryer module 40.

The present design differentiates from the prior art in that the coalescing filter 62, the particulate filter 80 and the air dryer 40 of the prior art are all connected in series external to the reservoir 26. The present design is an improvement over the prior art in that merely removing the cover plate 47 allows replacement and maintenance of the filters 62 and 80 and the dryer 40. No major disassembly is required. While the coalescing filter element 62 and the particulate filter 80 require annual maintenance, the membrane dryer 40 would be replaced every six to eight years depending on actual service conditions.

A variation of the combined module of FIG. 4 is illustrated in FIG. 5. Instead of a common drain valve in 82,84 for the coalescing filter element 62 and the particular filter 80, each filter has its own set of valves. The bottom of chamber 49 adjacent the coalescing filter includes a two-series valve 84A and 84C separated by sump 84B. A separate port as provided at the inner surface of the particular filter 80. A series set of valves 86A and 86C are separated by a sump 86B. The valves 84A and 84C and 86A and 86C are controlled by the CCB 32 as described for the valves 58 and 84 of FIG. 4. The valves 84A,86A are operated to remove the water, oil, etc., from the housing chamber 49 and empty into respective sumps 84B, 86B. The valves 84C,86C, which empty the sumps 84B,86B, may be operated at a different time than valve 84A,86A.

As a further modification, perforated tube 84 is provided between the cover plate 47 and the inlet 46A of the membrane dryer 40. This secures the membrane dryer within the housing 44.

Figure 6:
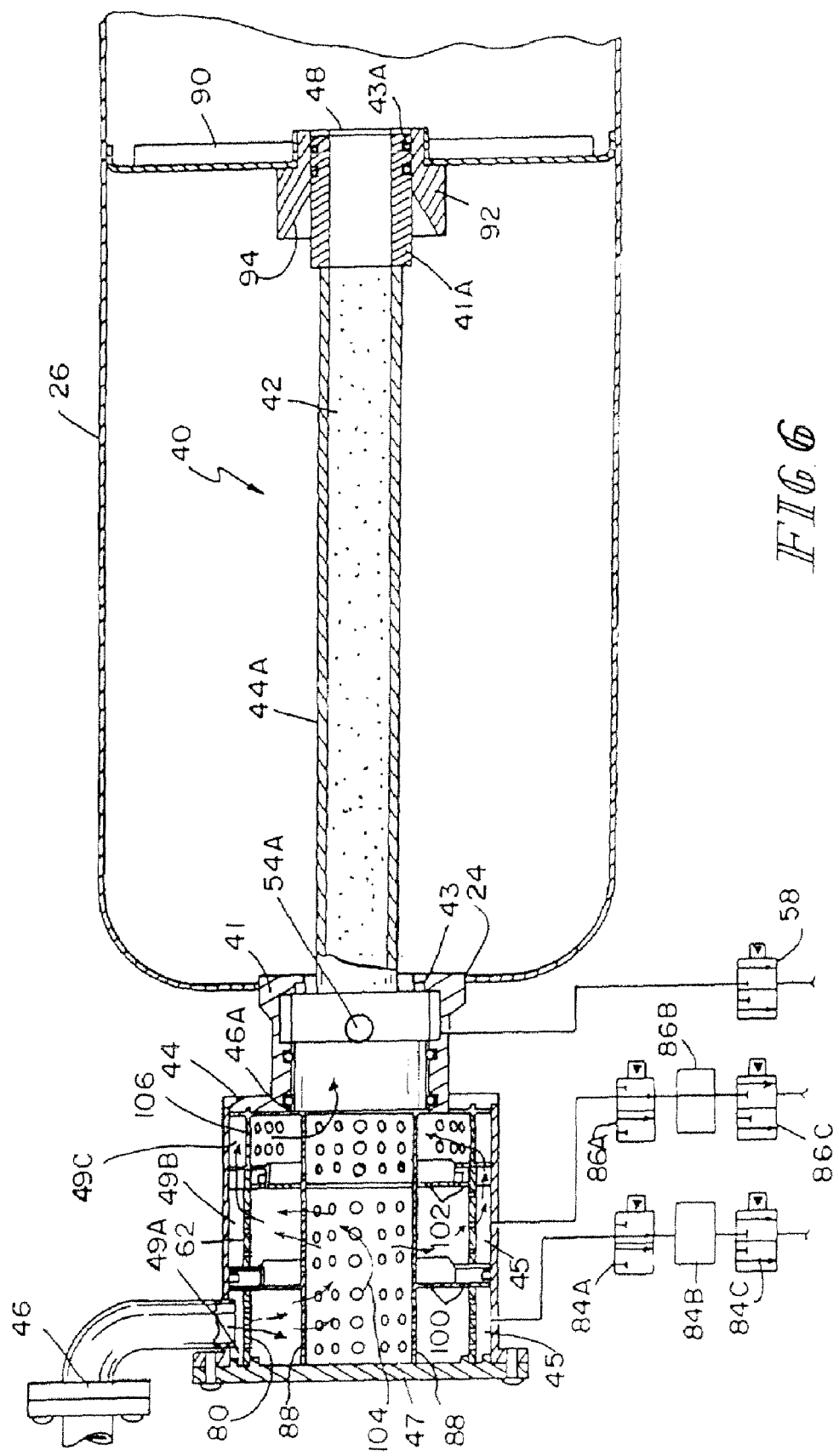
FIG. 6 is an embodiment of a membrane air dryer with integral particulate and coalescing filters arranged for inside-out flow of air through the coalescer.

FIG. 6 shows yet further modification whereby the particulate filter 80 and coalescing filter elements 62 are arranged axially, which provides for simplified inside-outside air flow through the coalescer. The chamber 49 of the housing 44 is divided into three chambers 49A,49B and 49C by walls 100 and 102. The air as shown by arrow 104 flows from inlet 46 and passes through particulate filter 80 and a portion of perforated tube 88 in chamber 49A to chamber 49B. The air then flows through portion of the perforated tube 88 and the coalescing filter element 62 in chamber 49B. Next, the air flows into chamber 49C and through perforated pipe 106 in chamber 49C to the inlet 49A of the membrane dryer 40.

Although the FIG. 6 shows separate drain valves for the particulate filter chamber 49A and coalescing chamber 49B, a single drain valve could be used to drain both chambers as described for FIG. 4.

The interior of the reservoir 26 may include a support bracket 90 welded or otherwise suitably attached thereto. A seat 92 receives end cap 41A of the membrane dryer 40.

O-rings may be provided on end cap 41A to secure the end cap 41A in the seat 92 and to minimize harmful vibration between the two. A cam surface 94 is provided to guide and align the end cap 41A into the seat 92. The bracket 90 may be provided in all the shown embodiments.

Although not shown in FIGS. 1-6, the area of the air inlet 46 into the chamber 49 is shaped or includes a baffle to distribute the air around the filters 62 and 80. A portion of this structure is shown in FIG. 7.

FIG. 7 illustrates a variation of the pre-filter housing which combines the concepts of the pre-filter illustrated in FIGS. 5 and 6. It provides concentric filters with an in/out flow through the coalescer filter 62.

The air dryer housing 44 includes housing portion 44A which houses the membrane element 42 and a housing portion 44B mounted in the opening in the inlet 24 of the reservoir 26, pre-filter housing portion 44C and a connecting housing portion 44D. As previously discussed, the membrane filter housing portion 44A is removable from the housing potion 44B which is mounted to the reservoir 26 either welded or shown in FIG. 7 or welded or connected to a flange on the exterior of the outlet 24 of the reservoir 26. Fasteners 111, shown as bolts, secure the housing section 44C to the housing portion 44B. The housing portion 44D is mounted on the cover plate 47 and the cover plate 47 is secured to housing portion 44C by fasteners 113, also illustrated as bolts.

Cylindrical wall 110 divides housing portion 44C into an inner chamber 114 and a concentric outer chamber 112. The coalescer 62 and the filter 80 are concentrically mounted in the outer chamber 112. A third filter 118 which may be, for example, a charcoal filter, is mounted in the inner chamber 114. A cap 115 secures the filter 118 to the cover plate 47 by a nut 119 threaded onto thread shaft 117. Housing portion 44D forms a chamber 116 between itself and the cover plate 47.

The air inlet 46 for the reservoir and the air dryer is connected through aperture 120 in the wall of housing portion 44C. It is introduced into the wall of annular chamber 122. The oblong aperture 120 provides somewhat of a tangential entry so as to create a swirling or circumferential airflow. The input air in annular chamber 122 is provided through a plurality of inlets 124 in the housing portion 44C interior the filter 80 and coalescer 62. The outlet for chamber 112 is through a plurality of outlets 126 exterior the coalescer 62 into chamber 116. This produces the inward/outward flow through the coalescer 62. The filtered air in chamber 116 is introduced into the interior of filter 118 by a plurality of inlets 128. The triple filtered air in chamber 114 is then provided through a plurality of outlets 130 in collar or manifold 41 to an inlet chamber 131 for the inlet of the membrane filter 40.

The structure of the housing as shown allows for disassembly and removal of the four filter elements without modification of the reservoir 26. The removal of fasteners 113 allows the removal of the cover plate 47 with housing portion 44D. This allows access and removal of the coalescer 62, the filter 80 and access to the filter 118. Removal of nut 119 allows replacement of the filter 118. The removal of fasteners 111 allows removal of housing portion 44C which allows access to the collar 41 and the membrane filter housing 44A and the membrane filter 42 itself. The pre-filter of FIG. 7 may include less than all three filters 62, 80, and 118. For example one or more of filters 80 and 118 may be deleted and the pre-filter would still have the inward/outward flow through the coalescer 62.

As in the previous FIGS. 5 and 6, valves 84A and 84C and sump 84B control the draining of the liquid from sump portion 45 of chamber 112 exterior the coalescer 62.

Another variation of the embodiment of FIG. 7 is that the sweep air is controlled at the sweep air inlet 51 instead of the sweep air outlet and drain 54. The drain 54 is open and exposed to atmosphere. The control valve 58 is at the inlet 51. The housing portion 44B in combination with the collar 41, are constructed as a manifold and provide the appropriate interconnections.

The inlet 51 for the sweep air passage from the interior of the reservoir 26 is not adjacent to the outlet 48 of the membrane filter 40, but is into passage 132 adjacent the inlet 44 of the membrane filter 40. Passage 132 is connected to the input of valve 58. The outlet of valve 58 is connected to passage 134 in housing portion 44B into circumferential chamber 136 in the collar manifold 41. A plurality of radial passages 138 connects the circumferential passage 136 to a centered inlet 140 in the collar 41. A tube 142 connects the inlet 140 to the interior of tube 150. The end 144 of tube 142 is flared and sealed to the interior of tube 150. This divides tube 150 into an inlet portion 150A and an outlet portion 150B. The inlet portion 150A exits out of a plurality of orifices 154 radially into the membrane filter 40 and flows through the first sweep air chamber or passage 52 (not shown). Tube 142 and tube portion 150A form a second sweep air passage having an inlet 140 adjacent the air inlet 46, 120 and an outlet 154 adjacent the air outlet 48.

The circulation of air in chamber 52 is opposite or counter to the air at inlets 130 to the membrane filter. The outlet of the sweep air passage 52 enters tube section 150B through a plurality of openings 156. The outlet of tube section 150B is connected at 158 to a plurality of radial passages 160 which are connected to an annular passage 162 which is connected directly to the drain 54.

The sweep passage air at inlet 51 is controlled by valve 58 to circulate through tube 142 and tube section 150A substantially the length of the membrane filter 40 to inlet openings 154 into the membrane filter. The counterflow from inlets 154 to outlets 156 through the sweep air passage 52 then exits through tube section 150B to drain 54. While the exterior sweep air inlet 51 and air outlet 54 are adjacent the air inlet for the membrane filter, the interior openings 154 and 156 provide the appropriate counterflow required for the membrane filter.

Although the pre-filter of FIG. 7 is shown with a unique sweep air control at the inlet, this pre-filtered structure may be used with the membrane control at the outlet of FIGS. 5 and 6.

It should be noted by controlling the sweep air at the inlet of the membrane filter, it eliminates pressure cycling of the membrane bundle which can result in fatigue failure of the membrane fibers. This would limit their useful life. Thus, the outlet and the membrane are continuously exposed to atmospheric pressure which is 14.7 psi. When the sweep air is flowing, the sweep air pressure around the membrane is less than 2 psi. This small change of pressure minimizes the pressure fluctuation or cycling of the membranes. Also by controlling the sweep air at the inlet versus the outlet, dry air from the interior of the reservoir 26 is flowing through the control valve 58. This not only extends the life of the control valve 58 but also does not require a heater at the control valve 58 to prevent freezing.

Figure 8:
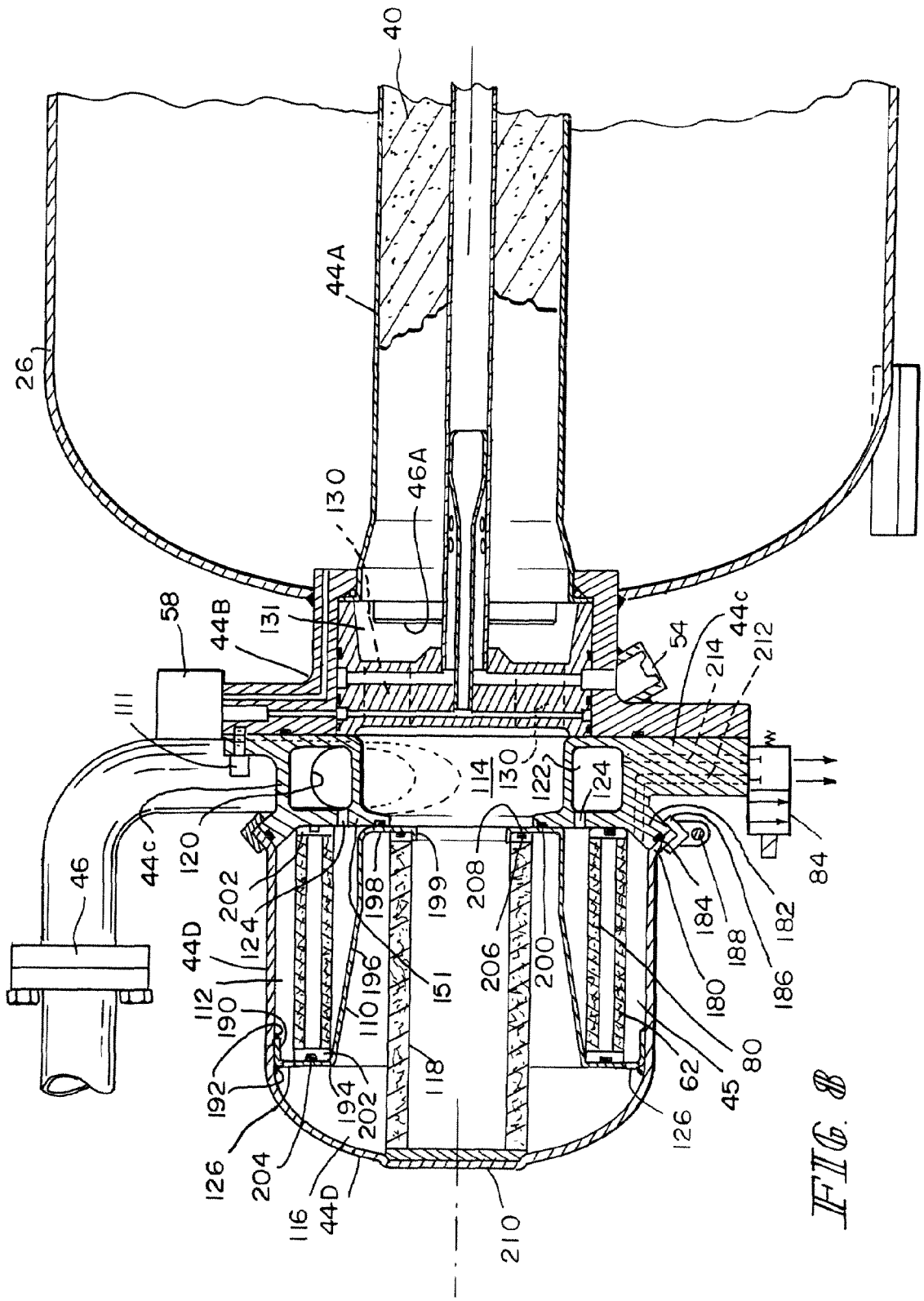
FIG. 8 is another embodiment of a membrane air dryer with integral particulate, coalescing and charcoal pre-filters arranged for inside-out flow of air through the coalescer

The variation on the three pre-filter configuration of FIG. 7 is illustrated in FIG. 8. Those elements which have the same function include the same number as that described in FIG. 7. As in FIG. 7, the pre-filter of FIG. 8 provides concentric filters with inflow/outflow through the coalescer filter 62.

The major modification to FIG. 7 is that housing portions 44C and 44D have been modified. Housing portion 44C is substantially shorter while housing portion 44D is made substantially larger. Housing portion 44C still includes the annular chamber 122 and the aperture 120 in its sidewalls. It also includes the inner chamber 114 connecting the output from the carbon filter 118 to the inputs 130 in the collar 41. The housing portion 44C also includes the plurality of inlets 124 to chamber 112 which includes the filters 62 and 80.

A flange generally cylindrically wall 110 divides the interior of housing portion 44D in the chamber 112 and 116. The flanged wall 110 has a generally s-shaped cross-section. Flange portion 190 is welded or otherwise affixed to the interior of the housing 44D at 192. Flange wail 194 includes the outlets 126 between chambers 112 and 116. The end wall 194 is connected by wall 196 to an end flange 198 which abuts the face 181 of housing portion 44C at gasket 200.

Endcaps 202 on filters 62 and 80 include a gasket 204 and is seated between flange 194 of wall 110 and the face 181 of the housing portion 44C. The filter 118 includes an endcap 206 with gasket 208 which engages the face flange 198 of wall 110, as well as end wall 199. The other end of filter 118 is received in a recess 210 in housing portion 44D.

Housing portion 44C includes a lip or protuberance 182 extending therefrom. The housing portion 44D includes a lip or protuberance 180. These two protuberances 180 and 182 mate with a seal 184 in the face of protuberance 182. A v-band 186 engages both the protuberances 180 and 182 and secures them onto each other. A clamping bolt 188 tightens the v-band 186.

The housing portion 44D includes the filter 118 mounted therein between the housing portion 44D and flanges 199 and 198. The cylindrical filters 62 and 80 are then inserted into chamber 112. This unitary pre-filter package is then mounted onto the central housing section 44C with the protuberances 180 and 182 mated. The v-band 186 secures them together. This allows all three assembled filters to be removed as a unit. As in FIG. 7, fasteners 111 would have to be removed to disconnect housing portions 44C and 44B to allow removal and servicing of the membrane filter 40.

By enlarging the housing portion 44D and making the wall of housing portion 44D and with the wall 110, of sheet metal, a very inexpensive pre-filter structure results. Thus, the housing portion 44D and the filters 62, 80 and 118 may be disposed of instead of being reused.

Another modification illustrated in FIG. 8 is the provision of an additional drain for the annular chamber 122 in center housing portion 44C. Passage 212 connects sump 45 of chamber 112 to valve 84. A passage 214 in that center housing portion 44C connects the annular chamber 122 to the valve 84. The valve 84 basically opens and closes both passages 212 and 214 to empty or drain of both of the chambers. The walls of the housing portion 44D may be slightly inclined to aid the flow of condensation in sump 45 to the passage 122.

As discussed in FIG. 7, the pre-filter of FIG. 8 may include less than three filters.

Although the present method has been described and illustrated in detail, it is to be clearly understood that this is done by way of illustration and example only and is not to be taken by way of limitation. Although the dryer has been shown in a train air supply system, it can also be used in a truck brake system. The particular filter structure may be used even if it is not mounted interior the reservoir. The scope of the present method is to be limited only by the terms of the appended claims.

What is claimed:

1. A filter comprising:
a housing having an air inlet, an air outlet, a first chamber and a second chamber concentric to and interior the first chamber, the air outlet and first and second chambers being coaxial along a first axis, and the air inlet having a second axis transverse to the first axis and displaced from the air outlet along the first axis;
a coalescer in the first chamber and a first filter in the second chamber;
a first inlet of the first chamber being interior the coalescer and connected to the air inlet and a first outlet of the first chamber being exterior the coalescer;
a second inlet of the second chamber being connected to the first outlet of the first chamber and a second outlet of the second chamber being connected to the air outlet; and
a membrane separator in the housing extending along the first axis from and connecting the second outlet of the second chamber to the air outlet.

2. The filter according to claim 1, wherein the first filter is a charcoal filter.

3. The filter according to claim 1, including a second filter in the first chamber concentric to the coalescer between the first inlet and the first outlet.

4. The filter according to claim 1, wherein the first outlet is a plurality of first outlets and the second inlet is a plurality of second inlets; and including a fourth chamber connecting the first outlets to the second inlets.

5. The filter according to claim 1, wherein the second outlet is a plurality of second outlets; and including a fifth chamber connecting the second outlets to the air outlet.

6. The filter according to claim 1, including a drain on the housing and connected to the first chamber.

7. The filter according to claim 1, wherein the housing includes a first and second portions removably secured to each other, the first and second chambers are in the first portion of the housing and the first filter is mounted to and removable with the second portion of the housing as a unit.

8. The filter according to claim 1, wherein the housing includes a first and second portions removably secured to each other; the air inlet and air outlet are in the first portion; and the first and second chambers, the coalescer and the first filter are in the second portion of the housing.

9. The filter according to claim 8, wherein the first and second housing portions include mating protuberances and a band clamp secures the mating protuberances to each other.

10. The filter according to claim 1, wherein the second inlet of the second chamber connected to the first outlet of the first chamber is interior the second filter, and the second outlet of the second chamber connected to the air outlet is exterior the first filter.

11. The filter according to claim 1, wherein the second inlet of the second chamber connected to the first outlet of the first chamber is exterior the second filter, and the second outlet of the second chamber connected to the air outlet is interior the first filter.

12. A filter comprising:
a housing having an air inlet, an air outlet, a first chamber and a second chamber concentric to and interior the first chamber,
a coalescer in the first chamber and a first filter in the second chamber;
a first inlet of the first chamber being interior the coalescer and connected to the air inlet and a first outlet of the first chamber being exterior the coalescer;

a second inlet of the second chamber being connected to the first outlet of the first chamber and a second outlet of the second chamber being connected to the air outlet;

an annulus shaped third chamber connecting the air inlet to the first inlet and an air input is on an outer circumference of the annulus; and a first drain connected to the first chamber and a second drain connected to the third chamber.

13. A filter comprising:

a housing having an air inlet, an air outlet, a first chamber and a second chamber concentric to and interior the first chamber, a coalescer in the first chamber and a first filter in the second chamber;

a first inlet of the first chamber being interior the coalescer and connected to the air inlet and a first outlet of the first chamber being exterior the coalescer;

a second inlet of the second chamber being connected to the first outlet of the first chamber and a second outlet of the second chamber being connected to the air outlet;

a membrane separator in the housing connecting the second outlet of the second chamber and the air outlet; and a first drain on the housing and connected to the first chamber and a second drain on the housing and connected to a sweep air outlet of the membrane separator.

14. The filter according to claim 13, including a valve connected between the sweep air outlet of the membrane separator and the second drain for controlling the draining of the liquid and sweep air flow through the membrane separator.

15. The filter according to claim 13, including a valve connected to a sweep air inlet of the membrane separator for controlling sweep air flow through the membrane separator.

16. A reservoir having an inlet and a filter, the filter comprising:

a housing having an air inlet, an air outlet, a first chamber and a second chamber concentric to and interior the first chamber, a coalescer in the first chamber and a first filter in the second chamber;

a first inlet of the first chamber being interior the coalescer and connected to the air inlet and a first outlet of the first chamber being exterior the coalescer;

a second inlet of the second chamber being connected to the first outlet of the first chamber and a second outlet of the second chamber being connected to the air outlet; and the housing extending from the exterior of the reservoir through the reservoir inlet into the interior of the reservoir so that the housing's air inlet is exterior the reservoir and forms the inlet of the reservoir, the housing's air outlet is interior the reservoir.

17. The reservoir according to claim 16, wherein the housing includes a first portion secured to the reservoir and a second portion removably secured to the first portion, and the first and second chambers are in and removable with the second portion of the housing as a unit.

18. The reservoir according to claim 17, including a membrane separator in the first portion of the housing connecting the second outlet of the second chamber and the air output.

19. The reservoir according to claim 17, wherein the housing includes a third portion removably secured to the second portion of the housing, and the first filter is mounted to and removable with the third portion of the housing as a unit.

20. The reservoir according to claim 16, wherein the housing includes a first portion secured to the reservoir, a second portion removably secured to the first portion, and a third portion removably secured to the second portion; the first and second chambers are in and removable with the third portion of the housing as a unit.

21. The reservoir according to claim 16, including a membrane separator in the housing connecting the second outlet of the second chamber and the housing's air outlet.

22. The reservoir according to claim 21, including a valve connecting the interior of the reservoir to a sweep air inlet of the membrane separator for controlling sweep air flow through the membrane separator.

23. A filter comprising:

a housing having first and second portions and a center portion, wherein the housing portions are removably secured to each other and the center portion is disposed between the first and second portions;

an air inlet disposed on the center portion;

an air outlet disposed on an end face of the second portion;

a first chamber and a second chamber disposed within the housing, wherein the second chamber is concentric to and interior to the first chamber;

a coalescer in the first chamber;

a first inlet into the first chamber, wherein the first inlet is interior the coalescer and is connected to the air inlet via a first passage in the center portion;

a first outlet from the first chamber, wherein the first outlet is exterior the coalescer and is connected to the second chamber;

a third chamber in the second housing portion;

a membrane separator in the third chamber, wherein the membrane separator has an outlet connected to the air outlet and wherein the membrane separator also has an inlet; and a second passage in the center portion connecting the second chamber to the inlet of the membrane separator.

24. The filter according to claim 23, including an annulus shaped fourth chamber in the center portion connecting the air inlet to the first inlet, wherein the air input is on an outer circumference of the annulus shaped fourth chamber.

25. The filter according to claim 24, including a first drain connected to the first chamber and a second drain connected to the fourth chamber.

26. The filter according to claim 23, including a first drain on the housing and connected to the first chamber and a second drain on the housing and connected to a sweep air outlet of the membrane separator.

27. The filter according to claim 26, including a valve connected between the sweep air outlet of the membrane separator and the second drain for controlling the draining of the liquid and sweep air flow through the membrane separator.

* * * * *